United States Patent [19]
Ota

[11] Patent Number: 5,615,541
[45] Date of Patent: Apr. 1, 1997

[54] WEEDER

[75] Inventor: Kinjiro Ota, Tokyo, Japan

[73] Assignee: Ota Kosan Corporation, Japan

[21] Appl. No.: 526,843

[22] Filed: Sep. 11, 1995

[30] Foreign Application Priority Data

Sep. 14, 1994 [JP] Japan .................................. 6-247062
Jun. 29, 1995 [JP] Japan .................................. 7-186414

[51] Int. Cl.⁶ ...................................................... A01D 11/00
[52] U.S. Cl. .............................. 56/239; 30/190; 172/374; 294/50.9
[58] Field of Search ........................ 56/239, 289, 16.4 R, 56/333, 335; 30/134, 135, 188, 190; 172/378, 374, 373; 7/114; 294/50.6, 50.9, 60, 19.1

[56] References Cited

U.S. PATENT DOCUMENTS

| | | | |
|---|---|---|---|
| 3,246,877 | 4/1966 | Lind | 294/50.9 |
| 4,157,198 | 6/1979 | McDaniels | 294/50.9 |
| 4,930,825 | 6/1990 | Dearman | 172/378 X |
| 5,375,401 | 12/1994 | Flickinger | 56/239 |
| 5,427,424 | 6/1995 | Robinson | 294/50.9 |

FOREIGN PATENT DOCUMENTS 474901  6/1992  Japan .

*Primary Examiner*—Terry Lee Melius
*Attorney, Agent, or Firm*—Dann, Dorfman, Herrell and Skillman, P.C.

[57] ABSTRACT

A weeder which a user can use in a standing posture, comprises an operating shaft having a longitudinal bore and a grip provided at an upper end thereof, the operating shaft having a length long enough to allow the user to operate the operating shaft in the standing posture while grasping the grip, a support rod telescoped in the longitudinal bore of the operating shaft, a chuck mechanism arranged at a lower end portion of the shaft for pulling out the weeds by the roots, the chuck mechanism including a pair of first and second frames and a pair of first and second chuck pawls for pinching the roots of the weeds, the first frame supported to a lower end portion of the rod, the second frame pivotally supported to the first frame, the first chuck pawl provided at a lower end of the first frame, the second chuck pawl provided at a lower end of the second frame, each of the first and second chuck pawls having a lower sharp end and adapted to be stuck into the ground when the shaft is pushed down against the ground by the user, a linkage mechanism provided between the shaft and the second frame for causing the second frame to be pivoted while causing a lower sharp end of the second chuck pawl to be closed toward a lower sharp end of the first chuck pawl, to thereby allow the lower sharp ends of the first and second chuck pawls to pinch the roots of the weeds therebetween.

12 Claims, 13 Drawing Sheets

FIG.10
FIG.11
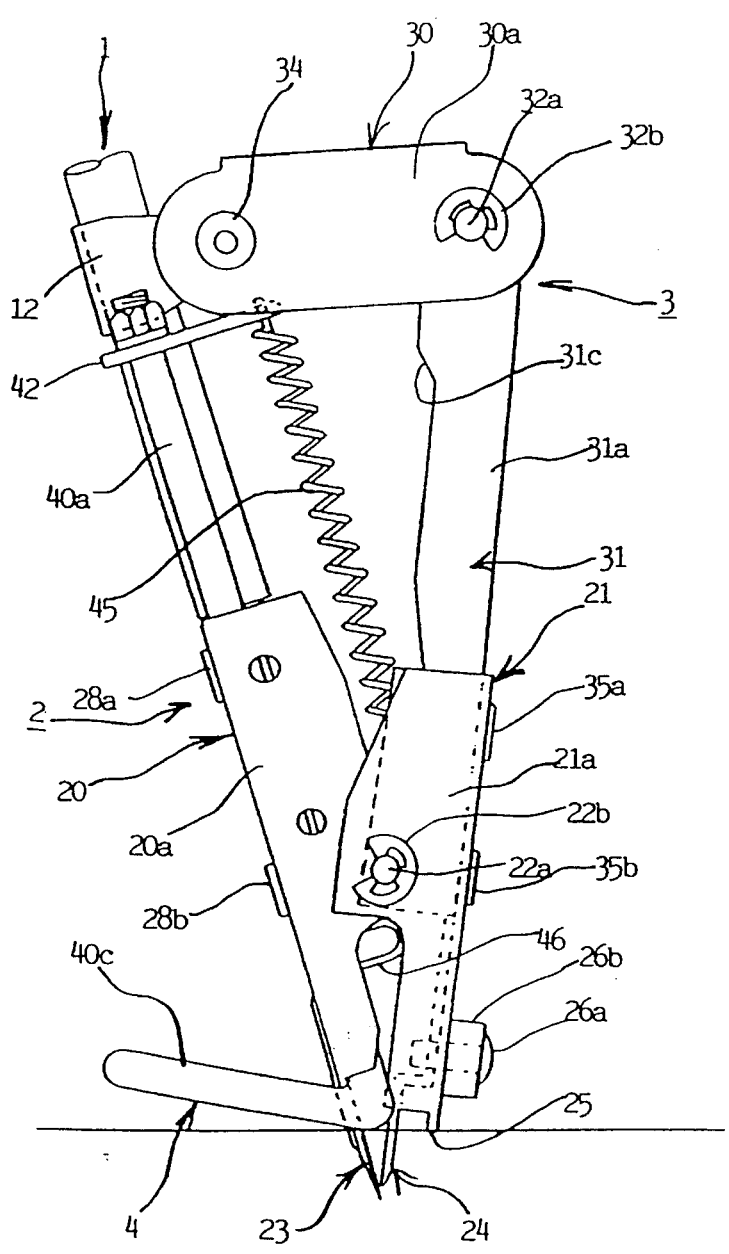
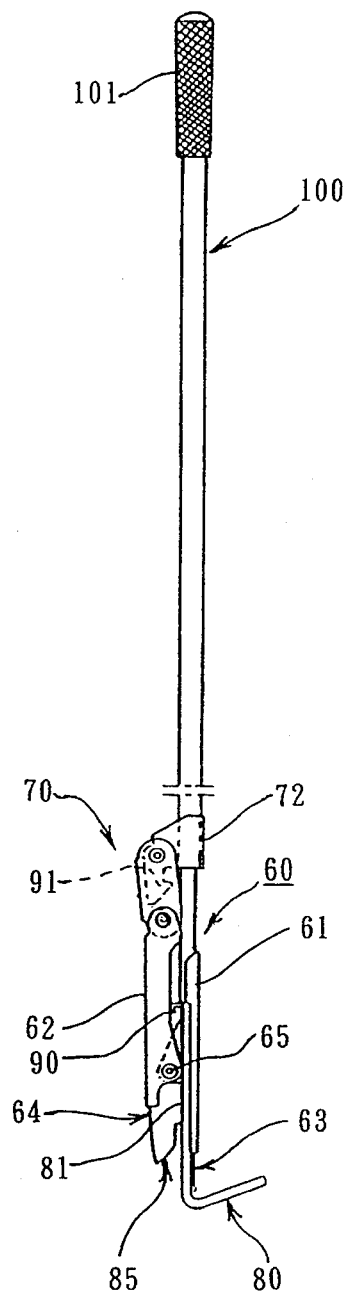

WEEDER

BACKGROUND OF THE INVENTION

1. Field of the Invention

This invention relates to an improvement of a weeder, and more particularly to a weeder which a user can operate in a standing posture when the user is to pick up a weed or weeds (hereinafter referred to as "weeds") in the ground by using the weeder.

2. Description of the Prior Art

This type of weeder is disclosed in Japanese Utility Model Application No. 118700/1990 (for an invention made by an inventor of the present invention) which was laid open to public inspection on Jun. 30, 1992 under Provisional Publication No. 74901/1992. The conventional weeder includes an operating shaft having a grip provided at one end portion thereof, a pair of chuck arms movably provided at the other end portion of the operating shaft through a pair of linkage means, and stopper means for preventing the movement of the chuck arms and maintaining the chuck arms in a closed state. The chuck arms are usually released from the stopper means and opened away from each other. When a user is to pick up weeds in the ground by using the weeder, the user grasps the grip of the operating shaft in a standing posture and grounds the opened chuck arms in a manner to cause the chuck arms to interpose the stems of the weeds therebetween. In this condition, when the user pushes the operating shaft down against the ground, the linkage means are operated, whereby the chuck arms are operatively closed toward each other while being moved nearer to each other on the ground. As a result, the stems of the weeds are pinched by the chuck arms. At this time, the chuck arms are adapted to be operatively engaged with the stopper means, whereby the chuck arms are maintained in the closed state. In this condition, the user pulls the operating shaft up, thereby picking up the weeds. Then, when the user applies any external force to the stopper means, the chuck arms are released from the stopper means and are operatively opened away from each other, whereby the weeds are released from the chuck arms.

In the conventional weeder, large operating forces are required to push the shaft down against the ground. In addition to this, the weeder is complex in construction and is very heavy. Further, the weeder is adapted to pick up weeds while pinching the stems of the weeds by the chuck arms, so that when the weeds are picked up by the weeder, there is a possibility that the weeds will be torn at the stems thereof and will be unable to be pulled out by the roots.

SUMMARY OF THE INVENTION

The present invention has been made with a view to overcoming the foregoing problems of the prior art weeder.

It is an object of this invention to provide a weeder which will be able to easily operated without resort to large operating forces.

It is another object of this invention to provide a weeder which is simple in construction and is lightweight. It is still another object of this invention to provide a weeder which will be able to pull out weeds by the roots.

In accordance with the present invention, there is provided a weeder which a user can use in a standing posture. The weeder comprises an operating shaft having a longitudinal bore and a grip provided at an upper end thereof, the operating shaft having a length long enough to allow the user to operate the operating shaft in a standing posture while grasping the grip, support rod means telescoped in the longitudinal bore of the operating shaft, chuck means arranged at a lower end portion of the operating shaft, the chuck means including a pair of first and second frames and a pair of first and second chuck pawls for pinching roots of weeds, the first frame supported to a lower end portion of the support rod means, the second frame pivotally supported to the first frame, the first chuck pawl provided at a lower end of the first frame, the second chuck pawl provided at a lower end of the second frame, each of the first and second chuck pawls having a lower sharp end and adapted to be stuck into the ground when the operating shaft is pushed down against the ground by the user, linkage means provided between the operating shaft and the second frame for causing the second frame to be pivoted while causing a lower sharp end of the second chuck pawl to be closed toward a lower sharp end of the first chuck pawl, to thereby allow the lower sharp ends of the first and second chuck pawls to pinch the roots of the weeds therebetween, first spring means for urging the linkage means in such a direction as to cause the linkage means to be stretched, grounding means for facilitating standing of the chuck means over the ground, the grounding means arranged between the first and second frames of the chuck means and supported to the chuck means in a manner to vertically movable relative to the chuck means, so that when the operating shaft is pushed down against the ground by the user, the chuck means is moved downwardly along the grounding means, and locking means for releasably locking the linkage means and maintaining the second chuck pawl in a closed condition relative to the first chuck pawl.

The weeder may further includes means for facilitating removal of the weeds from the first and second chuck pawls after the first and second chuck pawls pinch the roots of the weeds and pick up the weeds.

The grounding means may comprise a vertical body and a ground portion. The grounding portion obliquely extends in an upward direction from a lower end of the vertical body, so that when the weeder is to pick up the weeds, the grounding means can be used as a lever for facilitating the picking-up of the weeds.

In a preferred embodiment of this invention, each of the first and second frames comprises an elongated body of a substantially U-shape in cross section. The second frame is pivotally supported to the first frame with an opened side of a U-shaped body thereof facing to an opened side of a U-shaped body of the first frame. The linkage means includes a pair of first and second linkage members. The first linkage member is pivotally connected at one end thereof to the operating shaft. The second linkage member is pivotally connected at one end thereof to the second frame. The first and second linkage members are pivotally connected at the other ends thereof to each other by a support axis. The first spring means comprises a helical torsion coil spring. The helical torsion coil spring is mounted on the support axis, to thereby always urge the first and second linkage members in such a direction as to cause the first and second linkage members to be stretched. The grounding means comprises a pair of spaced apart vertical rod portions and an intermediate rod portion of a substantially U-shape interconnecting lower ends of the spaced apart rod portions. The vertical rod portions are supported to the chuck means in a manner to be vertically movable relative to the chuck means. The weeder further includes second spring means provided between the grounding means and the second frame, to thereby always urge the grounding means downwardly. The locking means comprises elongated leaf spring means attached to an upper end of the support rod means and extending upwardly from the upper end of the support rod means into the longitudinal bore of the shaft, and an opening formed in a circumferential wall region of the operating shaft which is near the grip. The elongated leaf spring means has pushing means provided at an upper free end thereof. The pushing means is adapted to be releasably engaged with the opening of the operating shaft. A support plate is mounted on upper end portions of the vertical rod portions of the grounding means. The second linkage member has an elongated body of a substantially U-shape in cross section. The U-shaped body of the second linkage member comprises two spaced apart sections and an intermediate section interconnecting the spaced apart sections of the second linkage member. The spaced apart sections of the second linkage member has sloping regions at free edges of the spaced apart sections of the second linkage member. The second linkage member is pivotally connected at the lower end portion thereof to the second frame with the free edges of the spaced apart sections thereof being engaged with the support plate. The first chuck pawl is formed integrally with the first frame. The first chuck pawl has at least one cavity, so that the first chuck pawl can be elastically deformed when the first chuck pawl pinches the roots of the weeds in cooperation with the second chuck pawl. The second chuck pawl is formed separately from the second frame. The second chuck pawl is formed with a notch, thereby constituting a leaf spring, and is attached to the second frame by means of a pin through an elastic ring member, so that the second frame can be elastically deformed when the second chuck pawl pinches the roots of the weeds in cooperation with the first chuck pawl. The weeder further includes means for facilitating removal of the weeds from the first and second chuck pawls after the first and second chuck pawls pinch the roots of the weeds and pick up the weeds. The means for facilitating removal of the weeds from the first thd second chuck pawls is provided between lower end portions of the vertical rod portions of the grounding means In a preferred embodiment of the present invention, each of the first and second frames comprises an elongated body of a substantially U-shape in cross section. The second frame is pivotally supported to the first frame with an opened side of a U-shaped body thereof facing to an opened side of a substantially U-shaped body of the first frame. The linkage means comprises an elongated linkage member. The linkage member is pivotally connected at one end thereof to the operating shaft through bracket means and pivotally connected at the other end thereof to the second frame by a support axis. The bracket means is mounted on the operating shaft. The first spring means comprises a helical torsion coil spring. The helical torsion coil spring is mounted on the support axis, to thereby always urge an assembly of the linkage member and the second frame in such a direction as to cause the assembly of the linkage member and the second frame to be stretched. The grounding means comprises a vertical plate portion, a grounding plate portion obliquely extending in an upward direction from a lower end of the vertical plate portion, and a cavity formed in an area of the grouding means between the vertical plate portion and the grounding plate portion of the grounding means for allowing the first chuck pawl to pass the cavity when the first chuck pawl is to be stuck into the ground. The vertical plate portion of the grounding means is supported to the chuck means in a manner to be vertically movable relatively to the chuck means and slightly tilted laterally. The locking means comprises first hook means and second hook means. The first hook means is provided at an upper end of the vertical plate portion of the grounding means. The second hook means is provided at the bracket means. The first hook means is adapted to be operatively engaged with the second hook means when the chuck means is moved downward along the grounding means. The first hook means comprises a hook-like plate portion provided at the upper end of the grounding means. The bracket means has a body of a substantially U-shape. The U-shaped body of the bracket means comprises two spaced apart sections and an intermediate section interconnecting the spaced apart sections of the bracket means. The second hook means comprises hook-like pieces provided at the spaced apart sections of the bracket means and hanging downwardly from the U-shaped body of the bracket means. The U-shaped body of the second frame comprises two spaced apart sections and an intermediate section interconnecting the spaced apart sections of the second frame. The spaced apart sections of the second frame have sloping regions at free edges thereof. The grounding means is supported to the chuck means with the first hook means provided at the upper end of the grounding means being engaged with the free edges of the spaced apart sections of the second frame. The weeder further includes second spring means for urging the grounding means in such a direction as to cause the first hook means provided at the grounding means to be operatively engaged with the second hook means when the chuck means is moved downward along the grounding means. The weeder further includes means for facilitating removal of the weeds from the first and second chuck pawls after the first and second chuck pawls pinch the roots of the weeds and pick up.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein:

FIGS. 9 and 10 are each a schematic enlarged front view and of assistance in explaining the operation of the weeder;

FIG. 11 is a schematic front view of the whole weeder according to a second embodiment of the present invention;

DETAILED DESCRIPTION OF THE PREFERRED EMBODIMENTS

Figure 1:
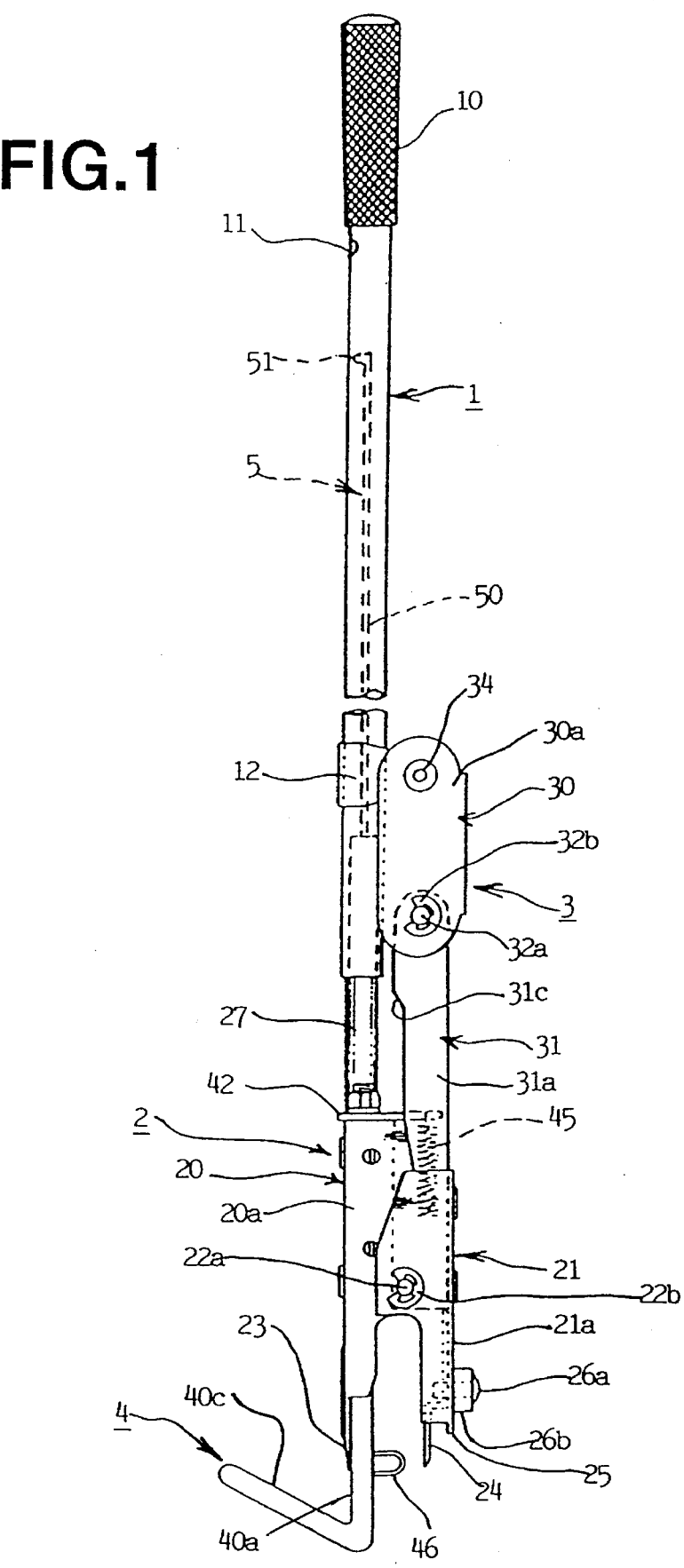
FIG. 1 is a schematic front view of the whole weeder according to a first embodiment of the present invention.

A weeder according to the present invention will be described hereinafter with reference to the accompanying drawings. As will be discussed in greater detail hereinafter, a user can operate the weeder of the present invention in a standing posture.

Referring to FIGS. 1 to 8, there is illustrated a weeder according to a first embodiment of the present invention. The weeder generally includes an operating shaft 1, chuck means 2 arranged at a lower end portion of the shaft 1 for pulling out weeds by the roots, the chuck means 2 including a pair of chuck pawls 23, 24 for pinching the roots of the weeds, linkage means 3 provided between the shaft 1 and the chuck means 2, grounding means 4 for facilitating standing of the chuck means 2 over the ground, and locking means 5 for releasably locking the linkage means 3 and maintaining the chuck pawls 23, 24 of the chuck means 2 in a closed state. In the illustrated embodiment, respective parts of the weeder are made of metal. Alternatively, the parts may be made of high-hard plastic material.

The shaft 1 is made of a pipe and has a grip 10 provided at an upper end thereof. The shaft 1 has a length long enough to allow a user to operate the shaft 1 in standing posture while grasping the grip 10 by hand. The shaft 1 is formed with an opening 11 in a circumferential wall region thereof which is near the grip 10. As will be discussed in greater detail hereinafter, pushing means 51 (see FIGS. 1 and 8) of the locking means 5 is adapted to be releasably engaged with the opening 11 of the shaft 1. In FIG. 1, reference numeral 27 denotes a support rod which is telescoped in a longitudinal bore of the shaft 1. When the shaft is pushed down against the ground by the user as will be discussed in greater detail hereinafter, the shaft 1 is adapted to be slid downwardly along the rod 27.

Figure 2:
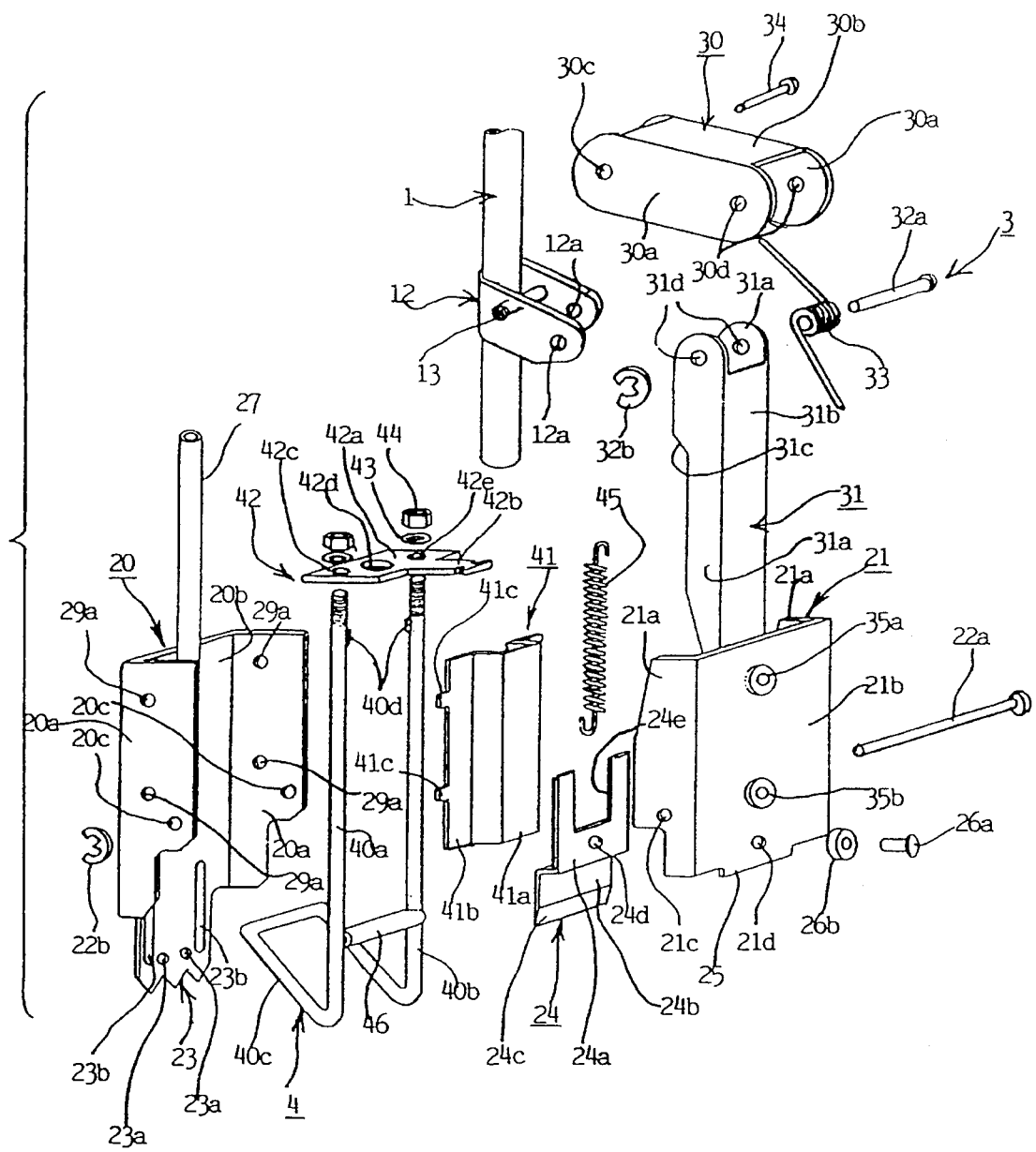
FIG. 2 is a schematic exploded perspective view of the weeder in which an upper end portion of an operating shaft of the weeder is cut away.

The chuck means 2 further includes first and second elongated frames 20, 21. Each of the first and second frames 20, 21 is formed into a substantially U-shape in corss-section. More particularly, as shown in FIG. 2, the first frame 20 comprises two spaced apart sections 20a and an intermediate section 20b interconnecting the spaced apart sections 20a. Similarly, the second frame 21 comprises two spaced apart sections 21a and an intermediate section 21b interconnecting the spaced apart sections 21a. The first frame 20 is attached at an inner surface of the intermediate section 20b thereof to a lower end portion of the rod 27 by means of rivets 28a, 28b (see FIG. 3). The second frame 21 is fitted on the first frame 20 with an opened side of the second U-shaped frame 21 facing to an opened side of the first U-shaped frame 20, and is pivotally supported to the first frame 20 by a support axis 22a which is inserted through holes 20c of the spaced apart sections 20a of the first frame 20 and holes 21c (only one is shown in FIG. 2) of the spaced apart sections 21a of the second frame 21. Thus, the second frame 21 is adapted to be pivoted about the support axis 22a as will be described hereinafter. As shown in FIG. 1, a clip 22b is mounted on an end of the support axis 22a in order to prevent the second frame 21 from being removed from the first frame 20.

Figure 3:
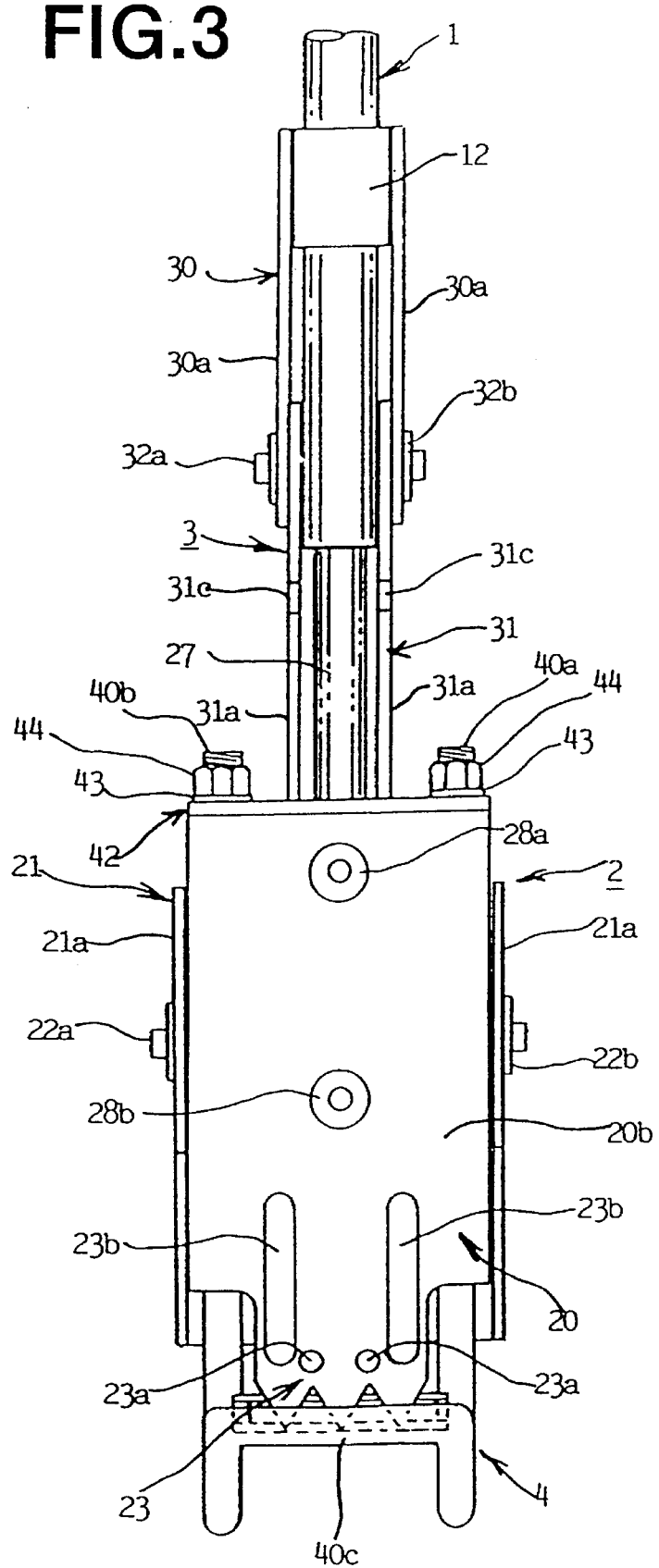
FIG. 3 is a schematic enlarged left side view of the weeder.
Figure 4:
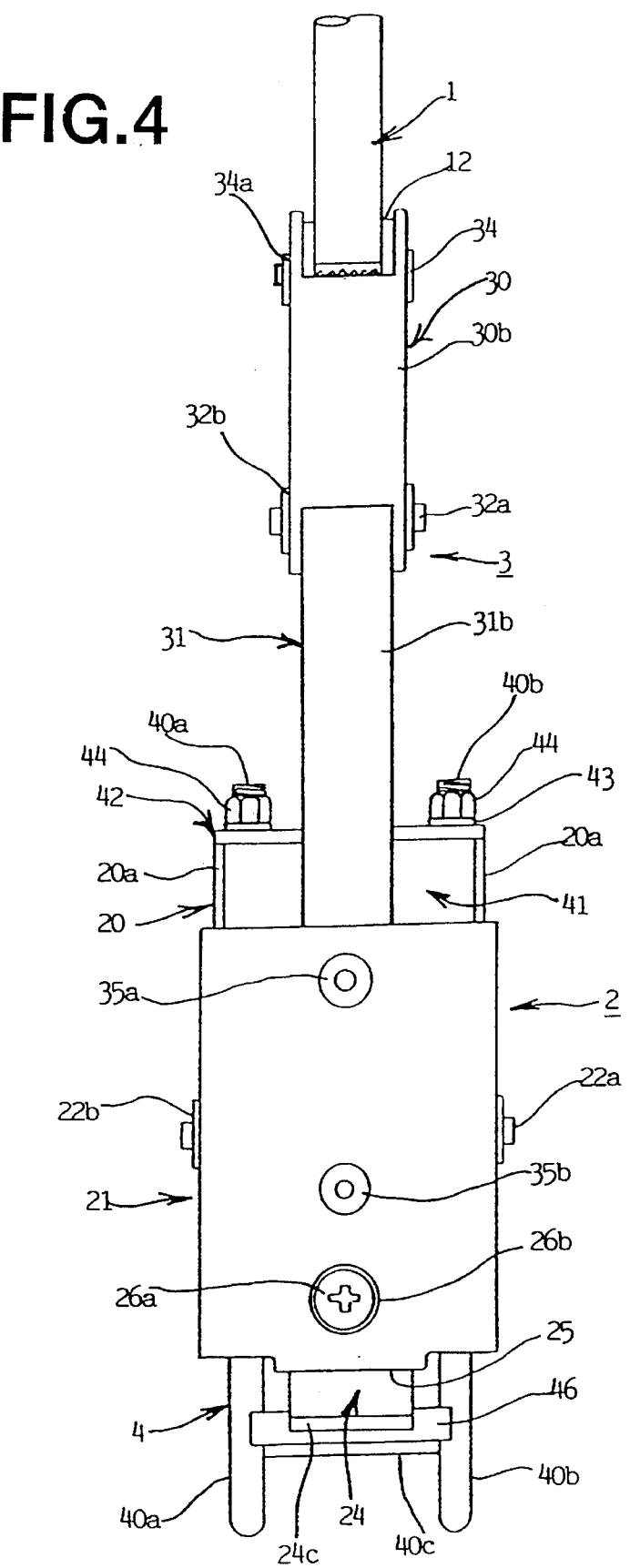
FIG. 4 is a schematic enlarged right side view of the weeder.

The first and second chuck pawls 23, 24 of the chuck means 2 are adapted to pinch the roots of weeds in the ground. As shown in FIGS. 2 and 3, the first chuck pawl 23 comprises a body which is formed integrally with the intermediate section 20b of the first frame 20 and hangs downwardly from the intermediate section 20b of the first frame 20. A lower end of the body of the first chuck pawl 23 is saw-toothed. When the user pushes the shaft 1 down against the ground in order to pick up weeds by using the weeder of the first embodiment, the saw-toothed end of the first chuck pawl 23 is adapted to be stuck into the ground. The body of the first chuck pawl 23 is formed with cavities 23a in portions thereof which are near valley regions of the saw-toothed end of the first chuck pawl 23, so that when the first chuck pawl 23 pinches weeds in cooperation with the second chuck pawl 24, the first chuck pawl 23 is adapted to be elastically deformed. Reinforcing ribs 23b extend vertically from the intermediate section 20b of the first frame 20 to the body of the first chuck pawl 23.

As shown in FIG. 2, the second chuck pawl 24 has a first plate section 24a of a substantially L-shape in section, and a second plate section 24b which hangs downwardly from a lower end of the first plate section 24a. A lower end of the second plate section 24b of the second chuck pawl 24 has a sharp edge 24c. The second chuck pawl 24 is attached onto an inner surface of the intermediate section 21b of the second frame 21 by a rivet 26a which is inserted through a hole 21d of the intermediate section 21b of the second frame 21 and a hole 24d of the first plate section 24a of the second chuck pawl 24. Mounted on the rivet 26a is an elastic ring member 26b. When the user pushes the shaft 1 down against the ground in order to pick up weeds in the ground by using the weeder of the first embodiment, the sharp edge 24c of the second chuck pawl 24 is adapted to be stuck into the ground. The first plate section 24a of the second chuck pawl 24 is formed with a notch 24e, thereby constituting a leaf spring. Since the first plate section 24a of the second chuck pawl 24 constitutes the leaf spring as described above, and the elastic ring member 26b is mounted on the rivet 26a, the second chuck pawl 24 can be elastically deformed when the second chuck pawl 24 pinches weeds in cooperation with the first chuck pawl 23.

The second frame 21 of the chuck means 2 has a stopper piece 25 provided at a lower edge of the intermediate section 21b thereof and projected downwardly. The stopper piece 25 is adapted to be abutted against the ground when the first chuck pawl 23 and the second chuck pawl 24 are stuck into the ground.

The linkage means 3 is provided between the shaft 1 and the second frame 21 of the chuck means 2, so that when the linkage means 3 is operatively bent, the second frame 21 is adapted to be pivoted about the support axis 22a while allowing the sharp edge 24c of the second chuck pawl 24 to be closed toward the saw-toothed end of the first chuck pawl 23. The linkage means 3 includes an upper elongated linkage member 30 and a lower elongated linkage member 31. Each of the first and second linkage members 30, 31 is formed into a substantially U-shape in section. More particularly, the upper linkage member 30 comprises two spaced apart sections 30a and an intermediate section 30b interconnecting the spaced apart sections 30a. Similarly, the lower linkage member 31 comprises two spaced apart sections 31a and an intermediate section 31b interconnecting the spaced apart sections 31a. Each of the spaced apart sections 31a of the lower linkage member 31 has a sloping region 31c at a free edge thereof which is near an upper end portion of the spaced apart section 31a. The upper linkage member 30 is pivotally connected at an upper end portion thereof to a U-shaped bracket piece 12, which is mounted on the shaft 1 with an opened side of the U-shaped bracket piece 12 receiving a portion of the shaft 1 therein, by a support pin 34 which is inserted through holes 30c (only one is shown in FIG. 2) of the spaced apart sections 30a of the upper linkage member 30 and holes 12a of the bracket piece 12. A clip 34a (see FIG. 4) is mounted on an end of the support pin 34. Incidentally, when the U-shaped bracket piece 12 is to be mounted on the shaft 1 for assembly, the bracket piece 12 is attached to the shaft 1 by a rivet (not shown) and is further fastened to the shaft 1 by means of a pin 13. The lower linkage member 31 is attached at a lower end portion thereof to the second frame 21 of the chuck means 2 by attaching the intermediate section 31b of the lower linkage member 31 onto an inner surface of the intermediate section 21b of the second frame 21 by means of rivets 35a, 35b. A lower end portion of the upper linkage member 30 and an upper end portion of the lower linkage member 31 are pivotally connected to each other by a support axis 32a which is inserted through holes 30d of the spaced apart sections 30a of the upper linkage member 30 and holes 31d of the spaced apart sections 31a of the lower linkage member 31. A clip 32b is mounted on an end of the support axis 32a. Further, a helical torsion coil spring 33 is mounted on the support axis 32a and always urges the linkage means 3 in such a direction as to cause the linkage means 3 to be stretched. The linkage means 3 is always stretched due to an action of the helical torsion coil spring 33, whereby the lower end of the second chuck pawl 24 of the second frame 21 is usually opened away from the saw-toothed end of the first chuck pawl 23 of the first frame 20.

Figure 5:
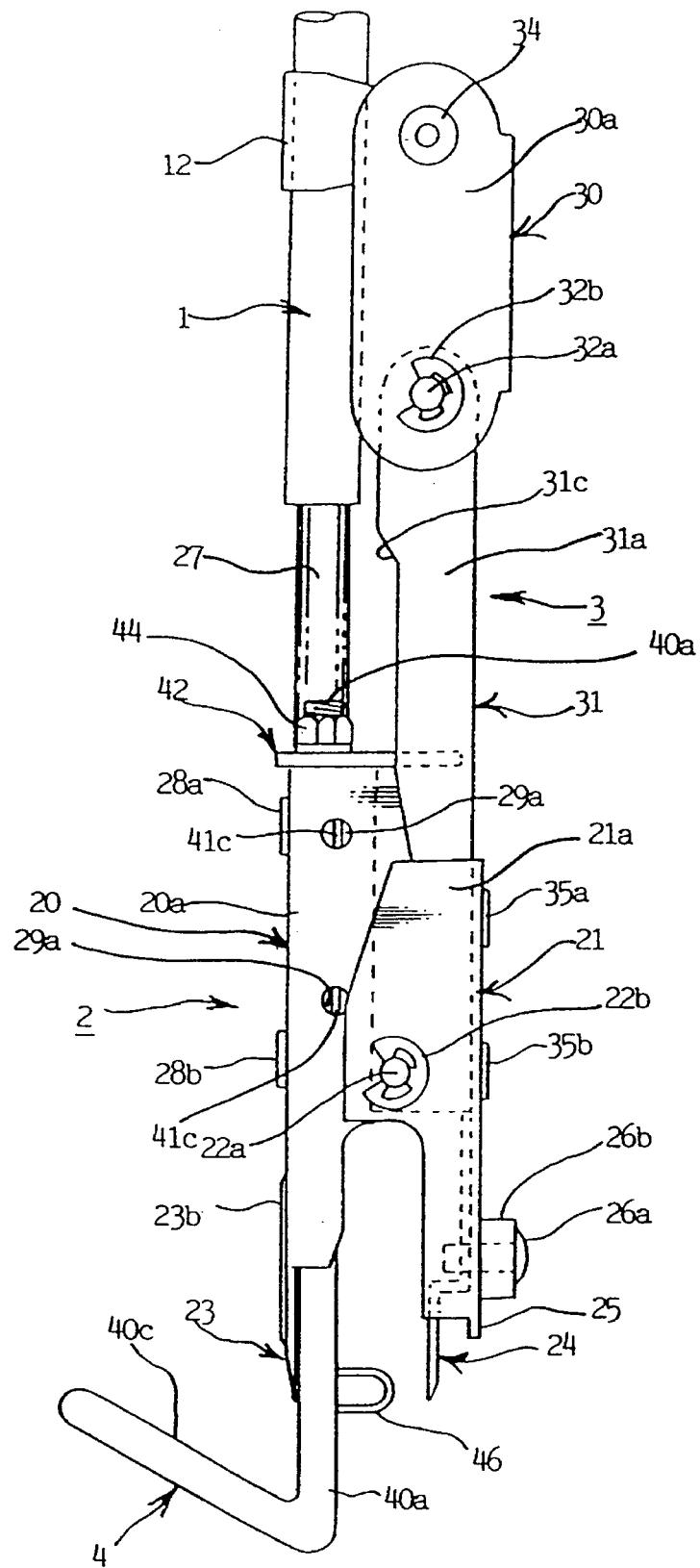
FIG. 5 is a schematic enlarged front view of the weeder.

In FIG. 2, reference numeral 41 denotes a spacer plate. The spacer plate 41 has a body 41a of a substantially U-shape in cross section, and a flat section 41b extending laterally from each of opposite sides of the U-shaped body 41a. The flat section 41b of the spacer plate 41 is provided with two projecting pieces 41c which project laterally from a side edge of the flat section 41b. Bearing on this, each of the spaced apart sections 20a of the first frame 20 is formed with holes 29a which correspond in number to the projecting pieces 41c of the spacer plate 41. The spacer plate 41 is vertically attached to the first frame 20 by causing each of the projecting pieces 41c of the spacer plate 41 to be fitted in corresponding one of the holes 29a of the first frame 20 as shown in FIG. 5. The grounding means 4 is vertically arranged between the first frame 20 and the spacer plate 41 in a manner to be vertically movable relative to the chuck means 2. Therefore, when the operating shaft 1 is pushed down against the ground, the chuck means 2 is moved downwardly along the grounding means 4.

The grounding means 4 has a body which is formed into a given shape by bending a rod material. More particularly, the body of the grounding means 4 includes two vertical rod portions 40a, 40b which are spaced apart from each other, and a substantially U-shaped intermediate rod portion 40c which interconnects a lower end of the vertical rod portion 40a and a lower end of the vertical rod portion 40b. The intermediate rod portion 40c of the grounding means 4 obliquely extends in an upward direction from the lower ends of the vertical rod portions 40a, 40b of the grounding means 4, so that when the first and second chuck pawls 23, 24 are to pick up weeds in the ground and connecting portions of the grounding means 4 between the vertical rod portions 40a, 40b and the intermediate rod portion 40c are grounded by the user, the connecting portions of the grounding means 4 are adapted to act as a fulcrum of a lever. Each of the vertical rod portions 40a, 40b of the grounding means 4 is provided with a projecting piece 40d which projects radially from an upper end portion of the vertical rod portion.

In FIG. 2, reference numeral 42 denotes a support plate for supporting the grounding means 4. The vertical rod portions 40a, 40b of the grounding means 4 are supported at the upper end portions thereof to the support plate 42. The support plate 42 includes a body 42a, and a projecting piece 42b which projects laterally from the body 42a. The body 42a of the support plate 42 has three holes 42c, 42d, 42e in a row. The support plate 42 is horizontally arranged on the projecting pieces 40d of the vertical rod portions 40a, 40b of the grounding means 4 and an assembly of the first frame 20 and spacer plate 41 by causing the rod 27 to be inserted through the central hole 42d of the support plate 42, and causing the upper end portions of the vertical rod portions 40a, 40b to be inserted through the holes 42c, 42e of the support plate 42 as shown in FIG. 7. As shown in FIGS. 3–7, the vertical rod portions 40a, 40b of the grounding means 4 are fastened to the support plate 42 by nuts 44 which are mounted on the upper ends of the vertical rod portions 40a, 40b of the grounding means 4 through washers 43. The projecting piece 42b of the support plate 42 projects in the lower U-shaped linkage member 31. Edge portions 42f (see FIG. 7) of the support plate 42 between which the projecting piece 42b is interposed are engaged with the edges of the spaced apart sections 31a of the lower U-shaped linkage member 31.

Figure 6:
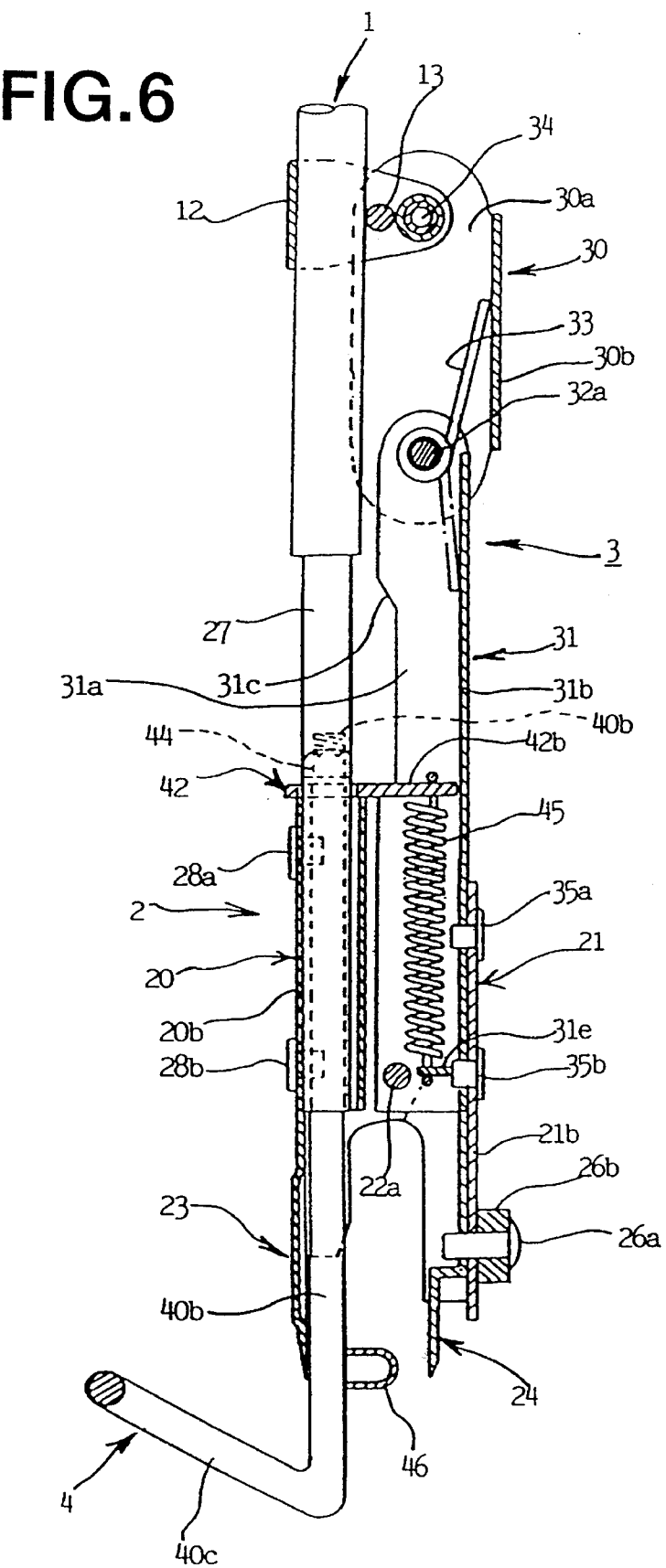
FIG. 6 is a schematic enlarged sectional front view of the weeder.
Figure 7:
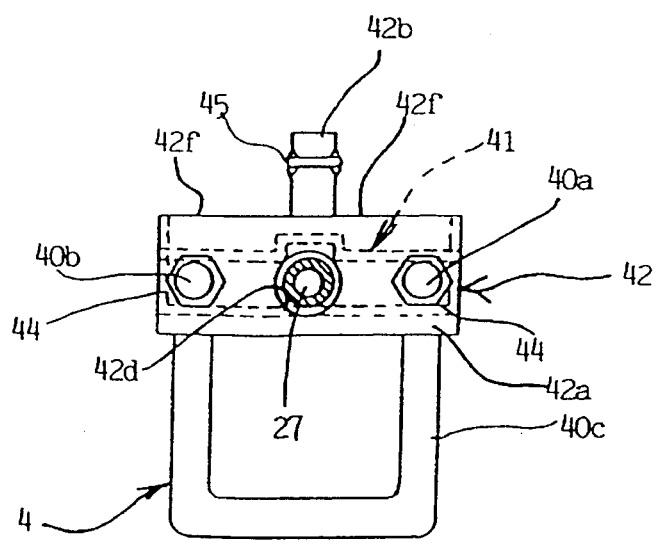
FIG. 7 is a schematic enlarged plan view showing a positional relationship between a support rod and a support plate of grounding means.

As shown in FIG. 6, the lower linkage member 31 is provided with a horizontally projecting piece 31e on the inner surface of the intermediate section 31b thereof. Provided between the horizontally projecting piece 31e of the lower linkage member 31 and the projecting piece 42b of the support plate 42 is a tension spring 45 which always urges the grounding means 4 downwardly.

The grounding means 4 further includes means 46 for facilitating removal of weeds from the first and second chuck pawls 23, 24 after the first and second chuck pawls 23, 24 pinch the roots of the weeds and pick up the weeds. The means 46 for facilitating removal of weeds from the first and second chuck pawls 23, 24 is provided between the lower end regions of the vertical rod portions 40a, 40b of the grounding means 4 and has a body of a substantially U-shape in section.

Figure 8:
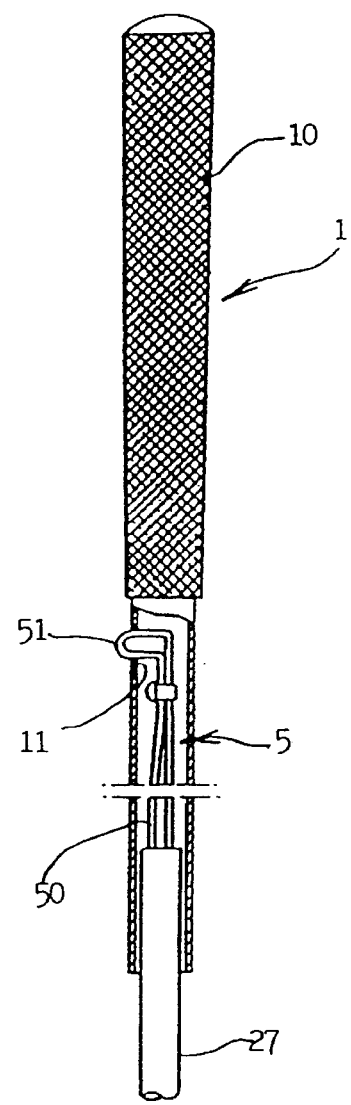
FIG. 8 is a schematic enlarged sectional view of the shaft.

The locking means 5 includes elongated leaf spring means 50 as shown in FIGS. 1 and 8. The elongated leaf spring means 50 extends upwardly from an upper end of the rod 27 into the bore of the shaft 1 and is attached at a lower end thereof to the upper end of the rod 27. The elongated leaf spring means 50 is provided at an upper free end thereof with the pushing means 51 briefly described above. As described above, the pushing means 51 is adapted to be releasably engaged with the opening 11 of the shaft 1. The pushing means 51 is usually disengaged from the opening 11 of the shaft 1 and is usually in a position lower than the opening 11 of the operating shaft 1 as shown in FIG. 1.

Figure 9:
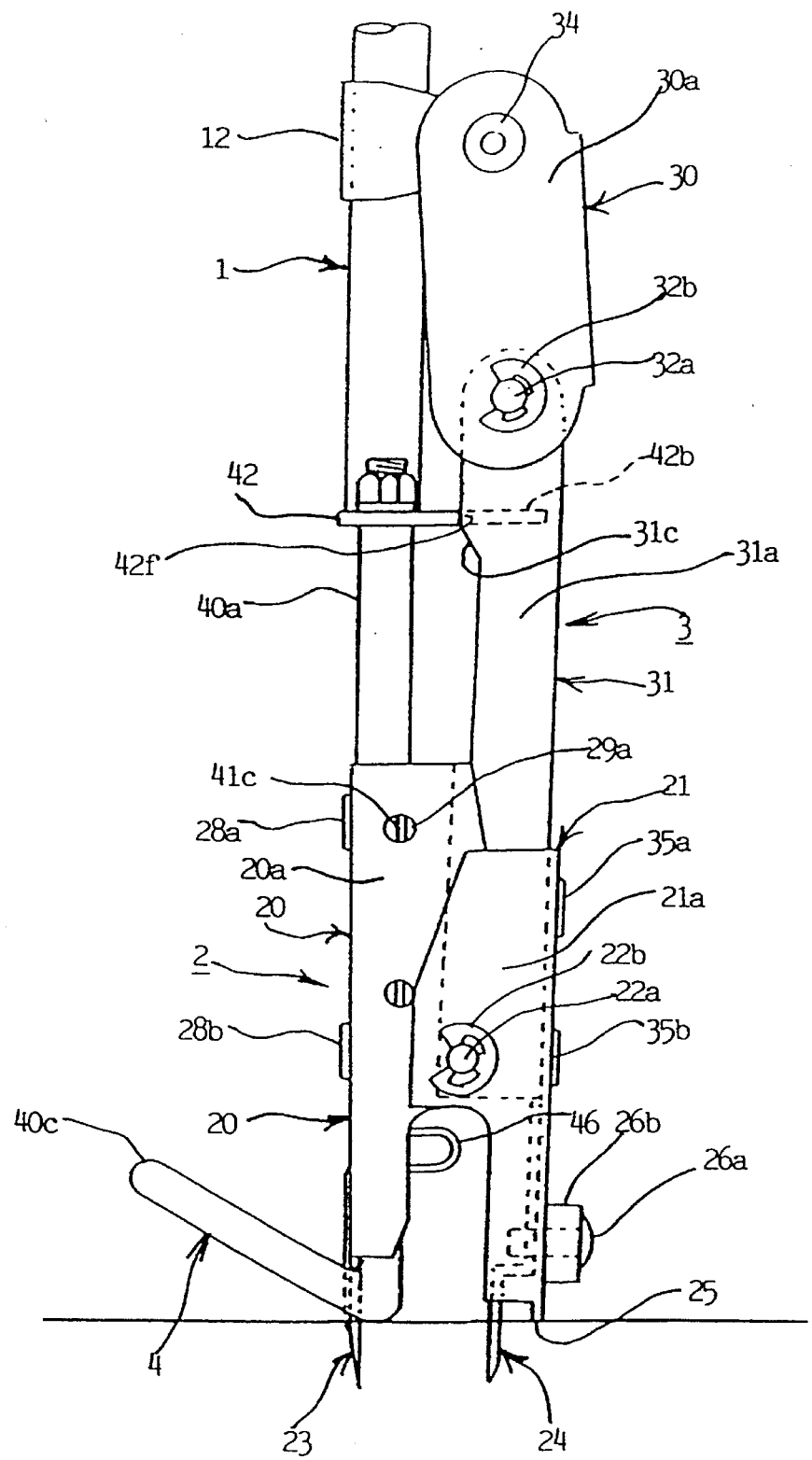

Referring now to FIGS. 9 and 10, the operation of the weeder of the first embodiment will be described hereinafter.

When the user is to pick up weeds in the ground by using the weeder of the first embodiment, the user grasps the grip 10 of the shaft 1 in a standing posture and grounds the connecting portions of the grounding means 4 between the vertical rod portions 40a, 40b of the grounding means 4 and the intermediate rod portion 40c of the grounding means 4 in such a manner that the connecting portions of the grounding means 4 are located near an area of the ground in which the weeds grow. In this condition, when the user pushes the shaft 1 down against the ground, the shaft 1 is moved downwardly while being slid along the rod 27. Simultaneously, the linkage means 3, which remains stretched due to an action of the helical torsion coil spring 33 mounted on the support axis 32a, is moved downwardly while causing the chuck means 2, which is supported at the first frame 20 thereof to the lower end portion of the rod 27 and connected at the second frame 21 thereof to the lower linkage member 31, to be moved downwardly along the vertical rod portions 40a, 40b of the grounding means 4. As a result, the first chuck pawl 23 is stuck into the ground while passing an opening of the U-shaped intermediate rod portion 40c of the grounding means 4. Also, the second chuck pawl 24 is stuck into the ground. At this time, the means 46 provided at the grounding means 4 for facilitating removal of weeds from the first and second chuck pawls 23, 24 is in a position upper than the lower ends of the first and second chuck pawls 23, 24 because the chuck means 2 was moved downwardly along the grounding means 4.

When the first and second chuck pawls 23, 24 are operatively stuck into the ground until the stopper piece 25 of the second frame 21 is abutted against the ground as shown in FIG. 9, the edge portions 42f of the support plate 42 of the grounding means 4 are operatively engaged with the sloping edge regions 31c of the spaced apart sections 31a of the lower linkage member 31. In this condition, when the shaft 1 is further pushed down against the ground by the user, the linkage means 3 is operatively bent against an action of the helical torsion coil spring 33 while being pushed laterally by the support plate 42 which is engaged at the edge portions 42f thereof with the sloping edge regions 31c of the spaced apart sections 31a of the lower linkage means 31. At this time, the tension spring 45 provided between the support plate 42 of the grounding means 4 and the lower linkage member 31 is stretched. Simultaneously with the operative bending of the linkage means 3, the second frame 21 is pivoted about the support axis 22a in a manner to cause the lower end of the second chuck pawl 24 of the second frame 21 to be closed toward the saw-toothed end of the first chuck pawl 23 of the first frame 20 as shown in FIG. 10. As a result, the roots of the weeds are pinched by the first and second chuck pawls 23, 24. At this time, the pushing means 51 of the leaf spring means 50 of the locking means 5 is operatively engaged with the opening 11 of the shaft 1 due to an elastic action of the leaf spring means 50 because the shaft 1 has been moved downwardly and the rod 27 has been operatively telescoped into the shaft 1, whereby the leaf spring means 50 has been moved upwardly. As a result, an action of the helical torsion coil spring 33, which tends to cause the linkage means 3 to be stretched, and an action of the tension spring 45, which tends to cause the chuck means 2 to be drawn upwardly relative to the grounding means 4, are prevented. Thus, the second chuck pawl 24 is maintained in a closed condition relative to the first chuck pawl 23, whereby the roots of the weeds remain pinched between the first and second chuck pawls 23, 24. In this condition, when the user pulls the shaft 1 up, the weeds can be pulled out by the roots. Also, when the user causes the shaft 1 to be pivoted with respect to the ground while using the connecting portions between the vertical portions 40a, 40b of the grounding means 4 and the intermediate rod portion 40c of the grounding 4 as a fulcrum of a lever, the weeds will be able to be easily pulled out by the roots. After the weeds which remain pinched between the first and second chuck pawls 23, 24 are pulled out by the roots by the pulling-up of the shaft 1, the user pushes the pushing means 51 of the locking means 5, to thereby cause the pushing means 51 to be disengaged from the opening 11 of the shaft 1. Simultaneously with the disengaging of the pushing means 51 from the opening 11 of the shaft 1, the linkage means 3 is operatively stretched due to the action of the helical torsion coil spring 33 and the tension spring 45 contracts, whereby relative movement between the chuck means 2 and the grounding means 4 occurs and the second frame 21 is pivoted in a manner to cause the lower end 24c of the second chuck pawl 24 to move away from the saw-toothed end of the first frame 20. As a result, the weeds are released from the first and second chuck pawls 23, 24. Simultaneously with the relative movement between the chuck means 2 and the grounding means 4, the means 46 for facilitating removal of weeds from the first and second chuck pawls 23, 24 is moved nearer to the first and second chuck pawls 23, 24. Therefore, when the lower end of the second chuck pawl 24 is moved away from the lower end of the first chuck pawl 23, resulting in the weeds being to be released from the first and second chuck pawls 23, 24, the means 46 is abutted against the weeds, thereby facilitating the removal of the weeds from the first and second chuck pawls 23, 24. Thus, the weeds pinched by the first and second chuck pawls 23, 24 can be easily and securely removed from the first and second chuck pawls 23, 24.

Referring to FIGS. 11 to 18, a weeder according to a second embodiment of the present invention will be discussed hereinafter. The weeder according to the second embodiment of the present invention is generally similar to that according to the first embodiment except that different locking means and different grounding means are employed.

As shown in FIG. 11, the weeder of the second embodiment generally includes an operating shaft 100, chuck means 60 arranged at a lower end portion of the operating shaft 100 for pulling out weeds by the roots, the chuck means 60 including a pair of chuck pawls 63, 64, linkage means 70 provided between the operating shaft 100 and the chuck means 60, grounding means 80 for facilitating standing of the chuck means 60 over the ground, and locking means for releasably locking the linkage means 70 and maintaining the first and second chuck pawls 63, 63 of the chuck means 60 in a closed condition.

Figure 12:
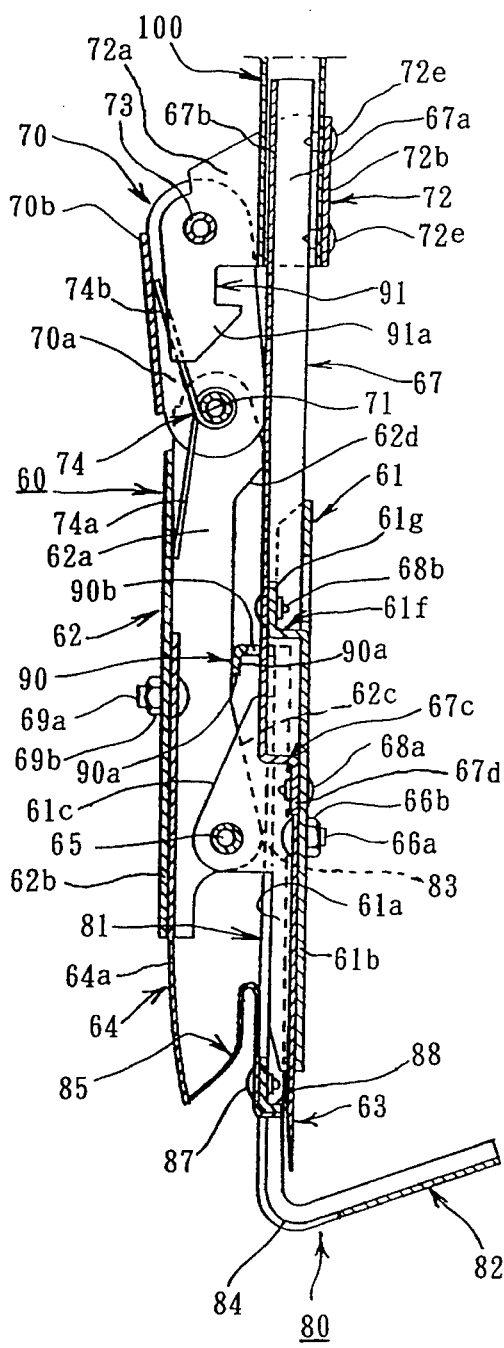
FIG. 12 is a schematic enlarged sectional front view of main components of the weeder of the second embodiment.
Figure 13:
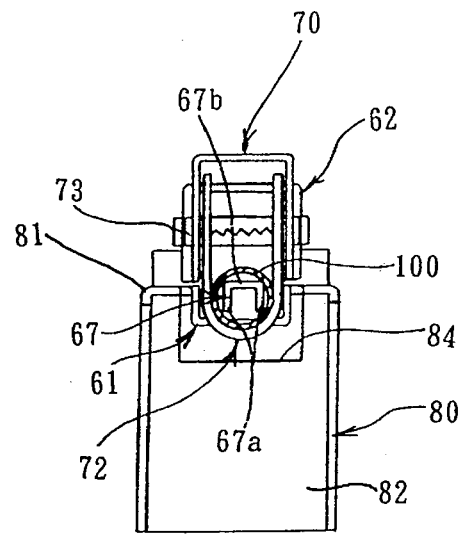
FIG. 13 is a schematic enlarged plan view of the main components of the weeder of the second embodiment.

The shaft 100 is made of a pipe and has a grip 101 provided at an upper end thereof. The shaft 100 has a length long enough to allow a user to operate the shaft 100 in a standing posture while grasping the grip 101 by hand. As shown in FIG. 12, a support rod 67 is telescoped in a longitudinal bore of the shaft 100 and extends downwardly from a lower end of the shaft 100. The support rod 67 comprises an elongated body of a substantially U-shape in cross section as shown in FIG. 13. More particularly, the body of the support rod 67 comprises two spaced apart sections 67a and an intermediate section 67b interconnecting the spaced apart sections 67a. As shown in FIG. 12, the body of the support rod 67 further has a downwardly extending piece 67c of a substantially inverted L-shape in section formed at a lower end of the body of the support rod 67. A vertical region 67d of the substantially inverted L-shaped piece 67c of the support rod 67 has a hole (not shown).

The chuck means 60 further includes a first elongated frame 61 and a second elongated frame 62. Each of the first and second frames 61, 62 is formed into a substantially U-shape in section. More particularly, the first frame 61 is formed into a substantially U-shape in section by cutting a sheet of metal material into a given shape shown in FIG. 14 and bending the metal sheet along alternate long and short dash lines indicated in FIG. 14. The first frame 61 comprises two spaced apart sections 61a and an intermediate section 61b interconnecting the spaced apart sections 61a. Each of the spaced apart sections 61a has a ridge portion 61c formed by bulging a portion of the spaced apart section 61a. Similarly, the second frame 62 comprises two spaced apart sections 62a (only one is shown in FIG. 12) and an intermediate section 62b interconnecting the spaced apart sections 62a. Each of the spaced apart sections 62a has a ridge portion 62c formed by bulging a region of the spaced apart section 62a which is near a lower portion of the spaced apart section 62a. Further, each of the spaced apart sections 62a of the second frame 62 has a sloping region 62d obliquely extending upwardly from a free edge of the spaced apart section 62a which is near an upper edge region of the spaced apart section 62a. Each of the ridge portions 62c of the spaced apart sections 62a of the second frame 62 is formed with a hole (not shown).

Figure 14:
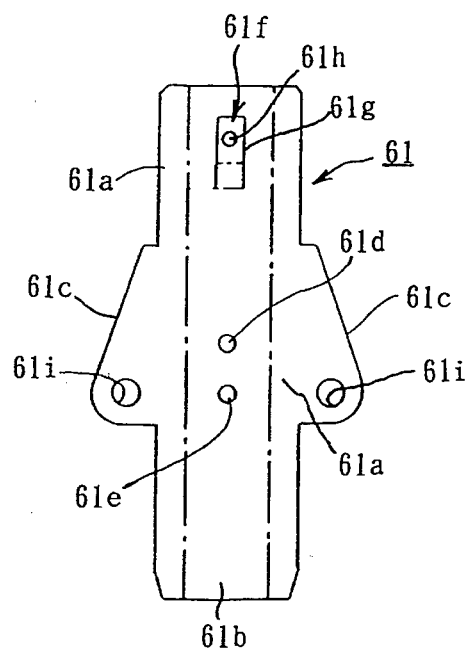
FIG. 14 is a schematic enlarged development of a first frame of the weeder of the second embodiment.

As shown in FIG. 14, the intermediate sections 61b of the first frame 61 has two vertically spaced apart holes 61d, 61e formed in a central portion thereof, and a rising piece 61f of a substantially L-shape in section (see FIG. 12) which provided at a region of the intermediate section 61b of the first frame 61 which is near an upper end of the intermediate section 61b. The rising piece 61f is formed at the region of the intermediate section 61b by partially cutting the region of the intermediate section 61b and bending the partially cut portion of the intermediate section 61b. A vertical region 61g of the substantially L-shaped rising piece 61f of the first frame 61 is formed with a hole 61h. Each of the ridge portions 61c of the spaced apart sections 61a of the first frame 61 has a hole 61i formed therein. As shown in FIG. 12, the first U-shaped frame 61 is attached to the U-shaped support rod 67 with an opened side of the first U-shaped frame 61 facing to an opened side of the support rod 67. More particularly, the first frame 61 is attached to the lower end portion of the support rod 67 by a rivet 68a, which is inserted through the unshown hole formed in the vertical region 67d of the downwardly extending piece 67c of the support rod 67 and the hole 61d (see FIG. 14) formed in the intermediate section 61b of the first frame 61, and by a rivet 68b which is inserted through an unshown hole formed in the intermediate section 67b of the support rod 67 and the hole 61h (see FIG. 14) formed in the vertical region 61g of the substantially L-shaped rising piece 61f of the first frame 61.

The second frame 62 is fitted on the first frame 61 with an opened side of the second U-shaped frame 62 facing to an opened side of the first U-shaped frame 61, and is pivotally connected to the first frame 61 by means of a support axis 65 which is inserted through the holes 61i (see FIG. 14) formed in the ridge portions 61c of the spaced apart sections 61a of the first frame 61 and the unshown holes formed in the ridge portions 62c of the spaced apart sections 62a of the second frame 62. Thus, the second frame 62 is adapted to be pivoted about the support axis 65.

Figure 15:
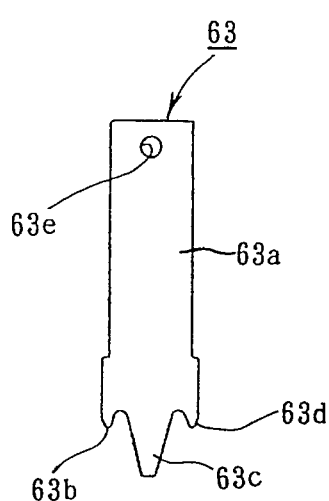
FIG. 15 is a schematic enlarged front view of a first chuck pawl of the weeder of the second embodiment.

The first frame 61 and the second frame 62 are provided with the first chuck pawl 63 and the second chuck pawl 64, respectively. As shown in FIG. 15, the first chuck pawl 63 includes a plate-like body 63a and three spaced apart pawl portions 63b, 63c, 63d which are formed at a lower end of the plate-like body 63a of the first chuck pawl 63 and hang downwardly from the lower end of the plate-like body 63a of the first chuck pawl 63. The central pawl portion 63c is longer than the right and left pawl portions 63b, 63d. Each of the pawl portions 63b–63d is sharply pointed. The body 63a of the first chuck pawl 63 is formed with a hole 63e at a region of the body 63a which is near an upper end portion of the body 63a. As shown in FIG. 12, the first chuck pawl 63 is attached onto an inner surface of the intermediate section 61b of the first frame 61 by a bolt 66a, which is inserted through the hole 63e (see FIG. 15) of the first chuck pawl 63 and the hole 61e (see FIG. 14) of the intermediate section 61b of the first frame 61, and a nut 66b which is mounted on an end of the bolt 66a.

As shown in FIG. 12, the second chuck pawl 64 comprises a strip-like body 64a which is slightly curved at a lower end portion thereof. The lower end portion of the strip-like body 64a of the second chuck pawl 64 has a sharp edge at a tip end thereof. The second chuck pawl 64 is attached onto an inner surface of the intermediate section 62b of the second frame 62 by means of a bolt 69a and a nut 69b. More particularly, the second chuck pawl 64 is attached to the second frame 62 with the curved end portion thereof extending downwardly from the second frame 62 and with the tip end of the curved end portion of the second chuck pawl 64 slightly facing toward the first chuck pawl 63 attached to the first frame 61.

Figure 16:
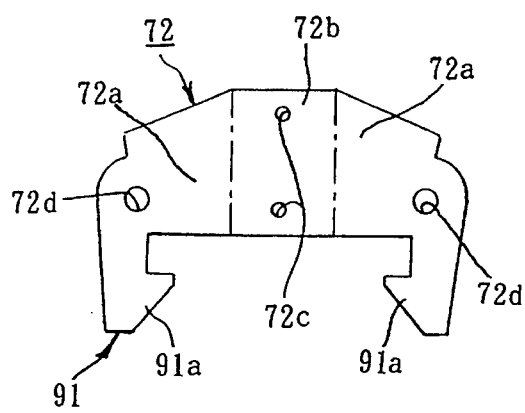
FIG. 16 is a schematic enlarged development of a bracket of the weeder of the second embodiment.

As shown in FIG. 12, the linkage means 70 is provided between the second frame 62 and the shaft 100. More particularly, the linkage means 70 comprises a substantially U-shaped linkage member in section which includes two spaced apart sections 70a (only one is shown in FIG. 12) and an intermediate section 70b interconnecting the spaced apart sections 70a. The linkage means 70 is pivotally connected to at a lower end portion thereof to an upper end portion of the second frame 72 by causing lower end portions of the spaced apart sections 70a of the linkage means 70 to be interposed between upper end portions of the spaced apart sections 62a of the second frame 62, and causing a pin 71 to penetrate the upper end portions of the spaced apart sections 62a of the second frame 62 and the lower end portions of the spaced apart sections 70a of the linkage means 70. A helical torsion coil spring 74 is mounted on the pin 71. The helical torsion coil spring 74 is engaged with the intermediate section 62b of the second frame 62 at one end 74a thereof and is engaged with the intermediate section 70b of the linkage means 70 at the other end 74b thereof. The helical torsion coil spring 74 always urges an assembly of the second frame 62 and linkage means 70 in such a direction as to cause the assembly of the second frame 62 and linkage means 70 to be stretched. Further, as will be discussed in greater detail hereinafter, the linkage means 70 is pivotally connected at an upper end portion thereof to a bracket 72 of a substantially U-shape in section which is mounted on a lower end portion of the operating shaft 100 with an opened side thereof receiving the lower end portion of the operating shaft 100 therein. The bracket 72 is formed into a substantially U-shape in section by cutting a sheet of metal material into a given shape shown in FIG. 16 and bending the cut metal sheet along alternate long and short dash lines indicated in FIG. 16. More particularly, as shown in FIG. 16, the bracket 72 includes two spaced apart sections 72a and an intermediate section 72b interconnecting the spaced apart sections 72a. The intermediate section 72b of the bracket 72 has two holes 72c which are vertically spaced apart from each other. Each of the spaced apart sections 72a of the bracket 72 has a hole 72d. As shown in FIG. 12, the bracket 72 is attached to the lower end portion of the operating shaft 100 by means of rivets 72e which are inserted through the holes 72c (see FIG. 16) of the intermediate section 72b of the bracket 72 and holes (not shown) which are formed at the lower end portion of the operating shaft 100. The linkage means 70 is pivotally connected at the upper end portion thereof to the bracket 72 by causing upper end portions of the spaced apart sections 70a of the linkage means 70 to be fitted on the spaced apart sections 72a of the U-shaped bracket 72, and causing a sprit pin 73 (see FIGS. 12 and 13) to be inserted through unshown holes formed in the upper end portions of the spaced apart sections 70a of the linkage means 70 and the holes 72d (see FIG. 16) formed in the spaced apart sections 72a of the U-shaped bracket 302.

Figure 17:
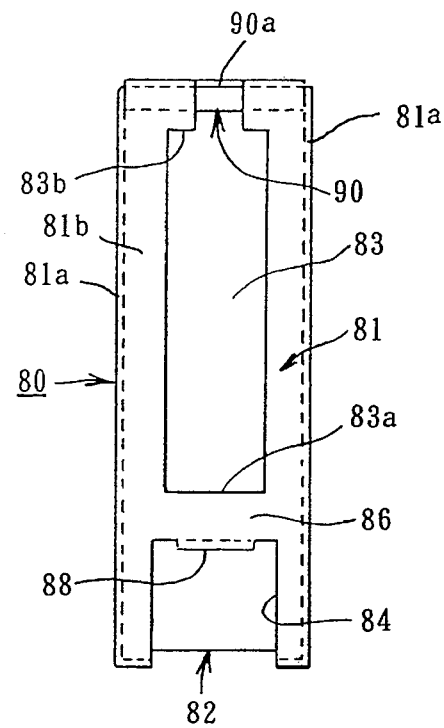
FIG. 17 is a schematic enlarged rear elevation of grounding means of the weeder of the second embodiment.
Figure 18:
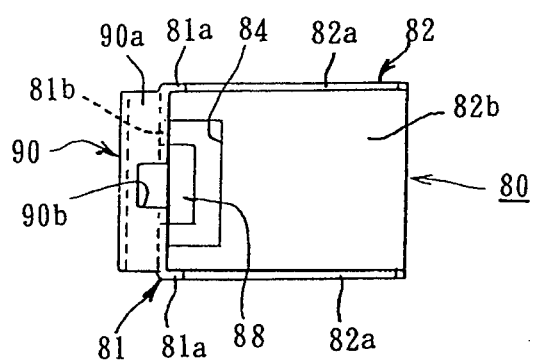
FIG. 18 is a schematic enlarged plan view of the grounding means shown in FIG. 17.

The grounding means 80 is assembled to the chuck means 60. As will be discussed in greater detail hereinafter, the grounding means is vertically supported to the chuck means 60 in a manner to be allowed to be vertically movable relative to the chuck means 60 and in a manner to be allowed to be slightly tilted laterally. More particularly, the grounding means 80 is vertically arranged between the first frame 61 and the second frame 62 and vertically movable relative to the first frame 61. Thus, when the operating shaft 100 is pushed down against the ground by a user, the chuck means 60 is moved downward along the grounding means 80. As shown in FIGS. 12 and 17, the grounding means 80 includes a vertical plate portion 81 and a grounding plate portion 82 obliquely extending in an upward direction from a lower end of the vertical plate portion 81. Each of the vertical plate portion 81 and the grounding plate portion 82 is formed into a substantially U-shape in cross section. More particularly, as shown in FIGS. 17 and 18, the vertical plate portion 81 includes two spaced apart sections 81a and an intermediate section 81b which interconnects the spaced apart sections 81a of the vertical plate portion 81. Similarly, as shown in FIG. 18, the grounding plate portion 82 includes two spaced apart sections 82a and an intermediate section 82b interconnecting the spaced apart sections 82a of the grounding plate portion 82. As shown in FIGS. 17 and 18, the grounding means 80 has a first big cavity 83 cut into the intermediate section 81b of the vertical plate portion 81 thereof and a second big cavity 84 extending from a lower region of the intermediate section 81b of the vertical plate portion 81 to a portion of the intermediate section 82b of the grounding plate portion 82. An upper edge of the second cavity 84 is provided with a horizontally projecting piece 88. The assembling of the grounding means 80 to the first frame 61 of the chuck means 60 is performed only by causing the ridge portions 61c of the spaced apart sections 61a of the first frame 61 to be inserted through the first big cavity 83 of the vertical plate portion 81 of the grounding means 80 as shown in FIG. 12. Therefore, the grounding means 80 is allowed to be slightly tilted laterally. Also, the grounding means 80 is adapted to be vertically movable relative to the chuck means 60. As will be discussed in greater detail hereinafter, when a user pushes the shaft 100 down against the ground in order to pick up weeds in the ground, thereby causing the shaft 100 to be moved downwardly, the chuck means 60 is adapted to be moved downwardly along the vertical plate portion 81 of the grounding means 80. The downward movement of the chuck means 60 along the vertical plate portion 81 of the grounding means 80 is adapted to be limited when the chuck means 60 is moved downwardly and lower edges of the ridge portions 61c of the spaced apart sections 61a of the first frame 61 are abutted against a lower edge 83a (see FIG. 17) of the first big cavity 83 of the grounding means 80.

Similarly, upward movement of the chuck means 60 along the vertical plate portion 81 of the grounding means 80 is adapted to be limited when the chuck means 60 is moved upwardly relative to the grounding means 80 and upper edges of the ridge portions 61c of the spaced apart sections 61a of the first frame 61 are abutted against an upper edge 83b of the first big cavity 83 of the grounding means 80. Incidentally, when the chuck means 60 is moved downwardly along the vertical plate portion 81 of the grounding means 80, the first chuck pawl 63 is adapted to pass the second big cavity 84 of the grounding means 80 and is stuck into the ground.

As shown in FIG. 12, a leaf spring member 85 is attached to the lower end portion of the vertical plate portion 81 of the grounding means 80. More particularly, the leaf spring member 85 is made by causing a strip-like metal material to be folded. One end portion of the leaf spring member 85 extends toward the second chuck pawl 64 and contacts the second chuck pawl 64a at the tip end thereof. The other end portion of the leaf spring member 85 is attached to the lower end portion of the vertical plate portion 81 of the grounding means 80 by causing the other end portion of the leaf spring member 85 to be wrapped around the projecting piece 88 of the grounding means 80 and attaching the other end portion of the leaf spring member 85 to a portion 86 (see FIG. 17) of the grounding means 80 between the first cavity 83 and the second cavity 84 of the grounding means 80 by means of a rivet 87.

The locking means for releasably locking the linkage means 70 and maintaining the chuck pawls 63, 64 in a closed state includes first hook means 90 and second hook means 91. As shown in FIGS. 12, 17 and 18, the first hook means 90 is provided at an upper end portion of the grounding means 80. More particularly, the first hook means 90 includes a hook-like plate portion 90a of a substantially inverted L-shape in section which is provided at the upper end of the vertical plate portion 81 of the grounding means 80 and projected laterally from the vertical plate portion 81 of the grounding means 80. A horizontal portion of the inverted L-shaped hook-like plate portion 90a is formed with a notch 90b which the lower end portion of the support rod 67 penetrates as shown in FIG. 12. As shown in FIGS. 12 and 16, the second hook means 91 is provided at the bracket 72. More particularly, the hook means 91 includes a hook piece 91a of a substantially L-shape which hangs downwardly from each of the spaced apart sections 72a of the bracket 72. When the first hook means 90 and the second hook means 91 are engaged with each other as will be described in greater detail hereinafter, the first and second chuck pawls 63, 64 are adapted to be maintained in a closed state.

Figure 19:
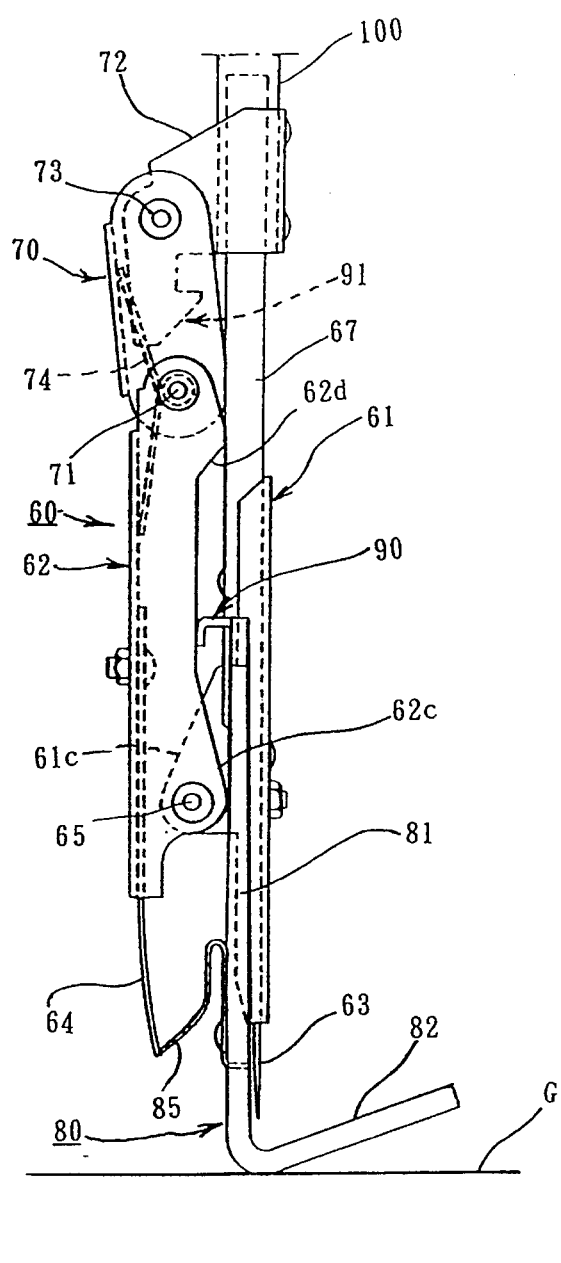
FIGS. 19–21 are each a schematic enlarged front view and of assistance in explaining the operation of the weeder of the second embodiment.
Figure 20:
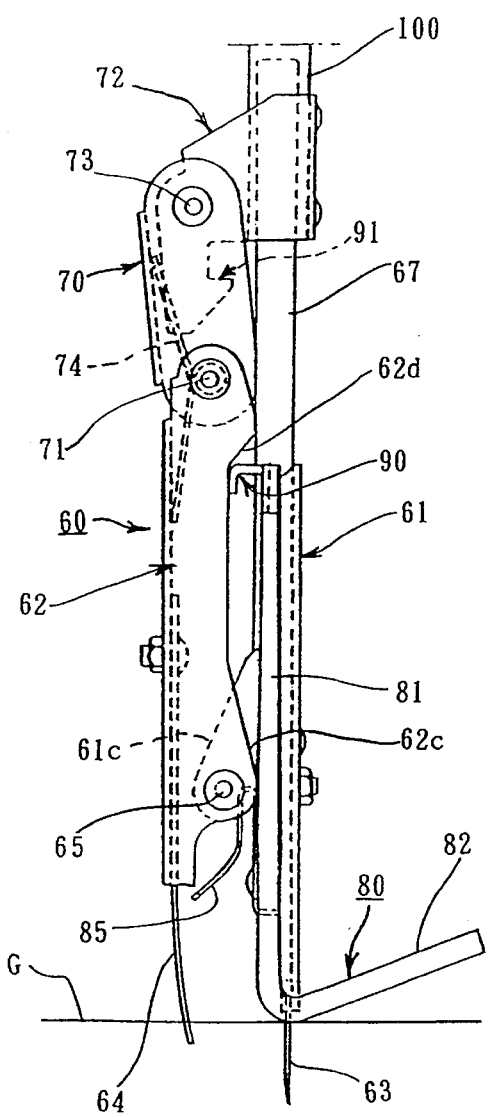
Figure 21:
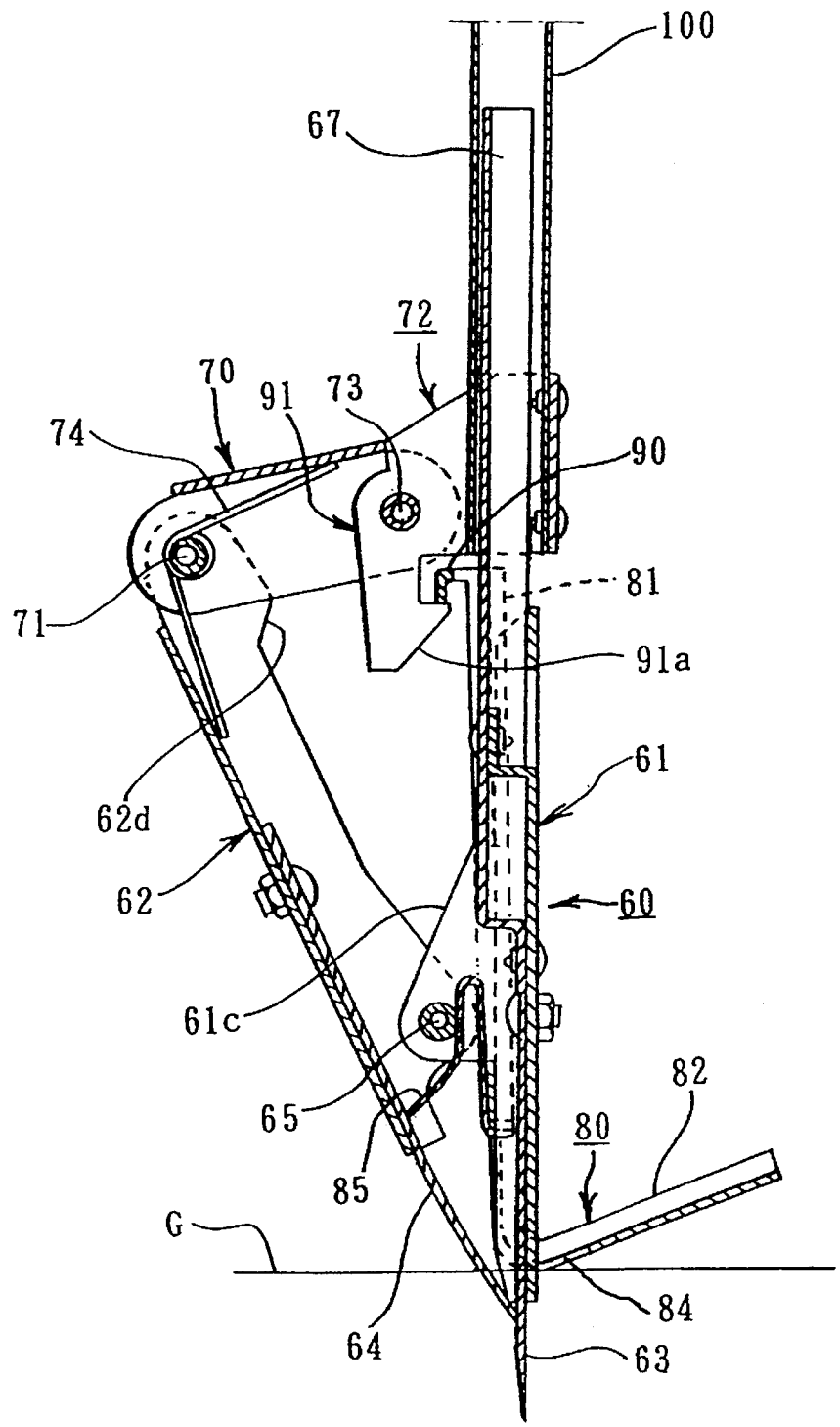

Referring now to FIGS. 19–21, the operation of the weeder of the second embodiment will be described hereinafter. When a user is to pick up weeds in the ground by using the weeder of the second embodiment, the user grasps the grip 101 of the operating shaft 100 in a standing posture and places a connecting portion of the grounding means 80 between the vertical palte portion 81 of the grounding means 80 and the grounding plate portion 82 of the grounding means 80 on an area of the ground G (see FIG. 19) in which the weedes grow. In a condition shown in FIG. 19, when the user pushes the shaft 100 down against the ground G, the assembly of the linkage means 70 and chuck means 60 is moved downwardly relative to the grounding means 80 while being guided along the vertical plate portion 81 of the grounding means 80 until the lower edges of the ridge portions 61c of the spaced apart sections 61a of the first frame 61 are abutted against the lower edge 83a of the first big cavity 83 of the grounding means 80. By the downward movement of the assembly of the linkage means 70 and chuck means 60, the chuck pawl 63 is stuck into the ground G while passing the second big cavity 84 of the grounding means 80. Also, the second chuck pawl 64 is stuck into the ground G as shown in FIG. 20. At this time, since the chuck means 60 was moved downwardly relative to the grounding means 80, the first hook means 90 which is provided at the upper end portion of the vertical plate portion 81 of the grounding means 80 is in an upward position and is operatively engaged with the sloping edges 62d of the spaced apart sections 62a of the second frame 62, to thereby urge the second frame 62 laterally. Simultaneously, the leaf spring member 85 of the grounding means 80 is in a position upper than the lower ends of the first and second chuck pawls 63, 64. In this condition, when the user further pushes the shaft 100 down against the ground, the assembly of the second frame 62 and linkage means 70 is operatively bent against an action of the helical torsion coil spring 74 mounted on the pin 71, while causing the support rod 67 to be retracted into the bore of the operating shaft 100 because the shaft 100 is pushed down against the ground G, the grounding means 80 is pressed against the ground G and the downward movement of the chuck means 60 relative to the grounding means 80 is prevented by the abutting of the lower edges of the ridge portions 61c of the spaced apart sections 61a of the first frame 61 against the lower edge 83a of the first big cavity 83 of the grounding means 80. The operative bending of the assembly of the linkage means 70 and second frame 62 causes the second frame 62 is pivoted about the support axis 65 in a manner to allow the lower end portion of the second chuck pawl 64 of the second frame 62 to be closed toward the lower end portion of the first chuck pawl 63 of the first frame 61. As a result, the roots of the weeds are pinched between the first and second chuck pawls 63, 64. Simultaneously with the operative bending of the assembly of the linkage means 70 and second frame 62, the first hook means 90 of the grounding means 80 goes over the sloping edges 62d of the spaced apart sections 62a of the second frame 62 while being engaged with the sloping edges 62d of the spaced apart sections 62a of the second frame 62. At this time, the hook means 90 of the grounding means 80 is urged in such a direction as to be operatively engaged with the second hook means 91 of the bracket 72 due to an action of the leaf spring member 85 of the grounding means 80. Thus, the first hook means 90 of the grounding means 80 is operatively engaged with the second hook means 91 of the bracket 72. As a result, the assembly of the second frame 62 and linkage means 70 is maintained bent as shown in FIG. 21, whereby the second chuck pawl 64 is maintained in a closed state relative to the first chuck pawl 63 and the roots of the weeds remain pinched between the first chuck pawl 63 and the second chuck pawl 64. In this condition, when the user pulls the shaft 100 up, the weeds can be pulled out by the roots. Incidentally, when the user causes the shaft 100 to be pivoted with respect to the ground G while using the connecting portion of the grounding means 80 between the vertical plate portion 81 of the grouding means 80 and the grounding plate portion 82 of the grounding means 80 as a fulcrum of a lever, the weeds will be able to be easily pulled out by the roots.

After the weeds are pulled out by the roots by the pulling-up of the shaft 100, when any external force, e.g., a kicking force is applied to the grounding plate portion 82 of the grounding means 80 by the user, the first hook means 90 provided at the upper end of the grounding means 80 is disengaged from the second hook means 91 of the bracket 72, because the grounding means 80 is supported to the chuck means 60 in a manner to be allowed to be slightly tilted laterally. Simultaneously with the disengaging of the first hook means 90 from the second hook means 91, the assembly of the second frame 62 and linkage means 70 is operatively stretched due to the action of the helical torsion coil spring 74, whereby relative movement between the chuck means 60 and the grounding means 80 occurs and the second frame 62 is pivoted about the axis 65 in a manner to cause the lower end of the second chuck pawl 64 to move away from the lower end of the first chuck pawl 63. As a result, the weeds are released from the first and second chuck pawls 63, 64. Simultaneously with the relative movement between the chuck means 60 and the grounding means 80, the leaf spring member 85 is moved nearer to the first and second chuck pawls 63, 64. Therefore, when the second chuck pawl 64 is moved away from the first chuck pawl 63, resulting in the weeds being released from the first and second chuck pawls 63, 64, the leaf spring member 85 is abutted against the weeds, thereby facilitating the removal of the weeds from the first and second chuck pawls 63, 64. Thus, the weeds pinched between the first and second chuck pawls 63, 64 can be easily and securely removed from the first and second chuck pawls 63, 64.

In the illustrated first and second embodiments, fasteners such as rivets, pins, bolts and nuts are employed as means to attach parts to other parts. Alternatively, the attaching of the parts to other parts may be carried out by welding. However, it is desirable that the attaching of the parts to other parts is performed by using such fasteners, because parts replacement can be easily performed if the attaching of the parts to other parts is carried out by using the fasteners.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the follwing claims are intended to cover all of the generic and specific features of the invention herein described, and all statements of the scope of the invention whichl, as a matter of language, might be said to fall therebetween.

What is claimed is:

1. A weeder, which a user can use in a standing posture, comprising:

an operating shaft having a longitudinal bore and a grip provided at an upper end thereof, said operating shaft having a length long enough to allow the user to operate said operating shaft in the standing posture while grasping said grip;

support rod means telescoped in said longitudinal bore of said operating shaft;

chuck means arranged at a lower end of said operating shaft;

said chuck means including a pair of first and second frames, and a pair of first and second chuck pawls for pinching roots of weeds;

said first frame supported to a lower end portion of said support rod means;

said second frame pivotally supported to said first frame;

said first chuck pawl provided at a lower end of said first frame;

said second chuck pawl provided at a lower end of said second frame;

each of said first and second chuck pawls having a lower sharp end and adapted to be stuck into the ground when said operating shaft is pushed down against the ground by the user;

linkage means provided between said operating shaft and said second frame for causing said second frame to be pivoted while causing a lower sharp end of said second chuck pawl to be closed toward a lower sharp end of said first chuck pawl, to thereby allow said lower sharp ends of said first and second chuck pawls to pinch the roots of the weeds therebetween;

first spring means for urging said linkage means in such a direction as to cause said linkage means to be stretched;

grounding means for facilitating standing of said chuck means over the ground;

said grounding means arranged between said first and second frames of said chuck means and supported to said chuck means in a manner to be vertically movable relative to said chuck means, so that when said operating shaft is pushed down against the ground by the user, said chuck means is moved downwardly along said grounding means; and locking means for releasably locking said linkage means and maintaining said second chuck pawl in a closed condition relative to said first chuck pawl.

2. A weeder as defined in claim 1, further including means for facilitating removal of the weeds from said first and second chuck pawls after said first and second chuck pawls pinch the roots of the weeds and pick up the weeds.

3. A weeder as defined in claim 1, wherein said grounding means comprises a vertical body and a grounding portion, said grounding portion obliquely extending in an upward direction from a lower end of said vertical body, so that when said weeder is to pick up the weeds, said grounding means can be used as a lever for facilitating the picking-up of the weeds.

4. A weeder as defined in claim 1, wherein each of said first and second frames comprises an elongated body of a substantially U-shape in cross section, said second frame pivotally supported to said first frame with an opened side of a U-shaped body thereof facing to an opened side of a U-shaped body of said first frame, wherein said linkage means includes a pair of first and second linkage members, said first linkage member pivotally connected at one end thereof to said operating shaft, said second linkage member pivotally connected at one end thereof to said second frame, said first and second linkage members pivotally connected at the other ends thereof to each other by a support axis, wherein said first spring means comprises a helical torsion coil spring, said helical torsion coil spring mounted on said support axis, to thereby always urge said first and second linkage members in such a direction as to cause said first and second linkage members to be stretched, wherein said grounding means comprises a pair of spaced apart vertical rod portions and an intermediate rod portion of a substantially U-shape interconnecting lower ends of said spaced apart rod portions, said vertical rod portions supported to said chuck means in a manner to be vertically movable relative to said chuck means, wherein said weed further includes second spring means provided between said grounding means and said second frame, to thereby always urge said grounding means downwardly, and wherein said locking means comprises elongated leaf spring means attached to an upper end of said support rod means and extending upwardly from an upper end of said support rod means into said bore of said operating shaft, and an opening formed in a circumferential wall region of said operating shaft which is near said grip, said elongated leaf spring means having pushing means provided at an upper free end thereof, said pushing means adapted to be releasably engaged with said opening of said operating shaft.

5. A weeder as defined in claim 4, wherein a support plate is mounted on upper end portions of said vertical rod portions of said grounding means, and wherein said second linkage member has an elongated body of a substantially U-shape in cross section, said U-shaped body of said second linkage means comprising two spaced apart sections and an intermediate section interconnecting said spaced apart sections of said second linkage member, said spaced apart sections of said second linkage member having sloping regions at free edges of said spaced apart sections of said second linkage member, said second linkage member pivotally connected at said lower end portion thereof to said second frame with said free edges of said spaced apart sections thereof being engaged with said support plate.

6. A weeder as defined in claim 4, wherein said first chuck pawl is formed integrally with said first frame, wherein said first chuck pawl has at least one cavity, so that said first chuck pawl can be elastically deformed when said first chuck pawl pinches the roots of the weeds in cooperation with said second chuck pawl, wherein said second chuck pawl is formed separately from said second frame, and wherein said second chuck pawl is formed with a notch, thereby constituting a leaf spring, and attached to said second frame by means of a pin through an elastic ring member, so that said second frame can be elastically deformed when said second chuck pawl pinches the roots of the weeds in cooperation with said first chuck pawl.

7. A weeder as defined in claim 4, fruther including means for facilitating removal of the weeds from said first and second chuck pawls after said first and second chuck pawls pinch the roots of the weeds and pick up the weeds, said means for facilitating removal of the weeds from said first and second chuck pawls provided between lower end portions of said vertical rod portions of said grounding means.

8. A weeder as defined in claim 1, wherein each of said first and second frames comprises an elongated body of a substantially U-shape in cross section, said second frame pivotally supported to said first frame with an opened side of a U-shaped body thereof facing to an opened side of a U-shaped body of said first frame, wherein said linkage means comprises an elongated linkage member, said linkage member pivotally connected at one end thereof to said operating shaft through bracket means and pivotally connected at the other end thereof to said second frame by a support axis, said bracket means mounted on said operating shaft, wherein said first spring means comprises a helical torsion coil spring, said helical torsion coil spring mounted on said support axis, to thereby always urge an assembly of said linkage member and said second frame in such a direction as to cause said assembly of said linkage member and said second frame to be stretched, wherein said grounding means comprises a vertical plate portion, a grounding plate portion obliquely extending in an upward direction from a lower end portion of said vertical plate portion, and a cavity formed in an area of said grounding means between said vertical plate portion and said grounding plate portion of said grouding means for allowing said first chuck pawl to pass said cavity when said first chuck pawl is to be stuck into the ground, said vertical plate portion of said grounding means supported to said chuck means in a manner to be vertically movable relative to said chuck means and slightly tilted laterally, and wherein said locking means comprises first hook means and second hook means, said first hook means provided at an upper end of said vertical plate portion of said grounding means, said second hook means provided at said bracket means, said first hook means adapted to be operatively engaged with said second hook means when said chuck means is moved downwardly along said grounding means.

9. A weeder as defined in claim 8, wherein said first hook means comprises a hook-like plate portion provided at said upper end of said grounding means, wherein said bracket means has a body of a substantially U-shape, said U-shaped body of said bracket means comprising two spaced apart sections and an intermediate section interconnecting said spaced apart sections of said bracket means, and wherein said second hook means comprises hook-like pieces provided at said spaced apart sections of said bracket means and hanging downwardly from said U-shaped body of said bracket means.

10. A weeder as defined in claim 8, wherein said U-shaped body of said second frame comprises two spaced apart sections and an intermediate section interconnecting said spaced apart sections of said second frame, said spaced apart sections of said second frame having sloping regions at free edges thereof, and wherein said grounding means is supported to said chuck means with said first hook means provided at said upper end portion of said grounding means being engaged with said free edges of said spaced apart sections of said second frame.

11. A weeder as defined in claim 8, further including second spring means for urging said grounding means in such a direction as to cause said first hook means provided at said grounding means to be operatively engaged with said second hook means when said chuck means is moved downwardly along said grounding means.

12. A weeder as defined in claim 8, further including means for facilitating removal of the weeds from said first and second chuck pawls after said frist and second chuck pawls pinch the roots of the weeds and pick up the weeds.

* * * * *